United States Patent
Tal et al.

(10) Patent No.: US 10,931,774 B2
(45) Date of Patent: Feb. 23, 2021

(54) DISCOVERY AND SERVICE MAPPING OF APPLICATION PROGRAMMING INTERFACE PROXIES

(71) Applicant: ServiceNow, Inc., Santa Clara, CA (US)

(72) Inventors: Hail Tal, Kohav Yair (IL); Tom Bar Oz, Herzliya (IL); Daniel Badyan, Tel Aviv (IL); Boris Erblat, Tel Aviv (IL); Alexandra Feiguine, Sha'ar Efrayim (IL); Aviya Aron, Shafir (IL); Robert Bitterfeld, Petach Tikva (IL); Bary Solomon, Petach Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 44 days.

(21) Appl. No.: 16/250,666

(22) Filed: Jan. 17, 2019

(65) Prior Publication Data

US 2020/0236187 A1     Jul. 23, 2020

(51) Int. Cl.
*H04L 29/08* (2006.01)
*H04L 29/06* (2006.01)

(52) U.S. Cl.
CPC ...... *H04L 67/2804* (2013.01); *H04L 63/1408* (2013.01); *H04L 63/306* (2013.01); *H04L 67/16* (2013.01)

(58) Field of Classification Search
CPC ............. H04L 67/2804; H04L 63/1408; H04L 63/306; H04L 67/16
See application file for complete search history.

(56) References Cited

U.S. PATENT DOCUMENTS

| | | | |
|---|---|---|---|
| 5,978,594 | A | 11/1999 | Bonnell |
| 6,321,229 | B1 | 11/2001 | Goldman |
| 6,609,122 | B1 | 8/2003 | Ensor |
| 6,799,189 | B2 | 9/2004 | Huxoll |

(Continued)

OTHER PUBLICATIONS

Hail Tal, Tom Bar Oz, Daniel Badyan, Boris Erblat, Alexandra Feiguine, Aviya Aron, Robert Bitterfeld, Bary Solomon, Apigee Edge discovery, ServiceNow Product Documentation, Published Aug. 14, 2018, Retrieved Dec. 14, 2018.

*Primary Examiner* — Uzma Alam
*Assistant Examiner* — Kamal M Hossain
(74) *Attorney, Agent, or Firm* — Fletcher Yoder PC

(57) ABSTRACT

A system includes a configuration management database (CMDB). Application programming interface (API) proxies associated with a managed network provide access to resources. The system also includes a discovery application configured to perform operations including determining a proxy uniform resource locator (URL) used to provide access to a particular resource of the resources through an API proxy of the API proxies and obtaining, from a computing device associated with the API proxy, an assignment of proxy URLs to corresponding target URLs by the API proxy. Each target URL of the corresponding target URLs address a respective resource of the resources. The proxy URLs are used to provide access to the resources through the API proxy. The operations also include selecting, from the assignment, a target URL assigned to the proxy URL, generating a mapping between the proxy URL and the target URL, and storing the mapping in the CMDB.

18 Claims, 11 Drawing Sheets

(56) References Cited

U.S. PATENT DOCUMENTS

| | | | |
|---|---|---|---|
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambanepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranajan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 10/2017 | George |
| 9,818,729 B1 | 11/2017 | Chiu et al. |
| 9,967,162 B2 | 5/2018 | Spinelli |
| 10,002,203 B2 | 6/2018 | George |
| 10,425,465 B1 * | 9/2019 | Jha ................ H04L 67/20 |
| 2012/0296929 A1 * | 11/2012 | Hossain ........... G06F 16/951 |
| | | 707/769 |
| 2013/0212215 A1 * | 8/2013 | Ukkola ............ H04L 67/02 |
| | | 709/217 |
| 2016/0226871 A1 * | 8/2016 | Stephure .......... H04L 67/42 |
| 2016/0301739 A1 * | 10/2016 | Thompson ........ G06F 9/547 |
| 2018/0124197 A1 * | 5/2018 | Srivastava ........ H04L 67/2819 |
| 2018/0146049 A1 * | 5/2018 | Africa ............. H04L 41/0873 |

* cited by examiner

DISCOVERY AND SERVICE MAPPING OF APPLICATION PROGRAMMING INTERFACE PROXIES

BACKGROUND

Computing devices, software applications, software services, databases, and other computing resources that make up a managed computer network may be discovered and the relationships therebetween may be mapped. These elements of the managed network, as well as the relationships, may be stored as configuration items in a database. The stored configuration items may later be retrieved and used to generate a visualization of a state or arrangement of these elements within the managed network. Discovering a computing device, database, software application, software service, or other computing resource involves developing software processes that are capable of interacting with the devices, databases, applications, or services in order to gather information needed for detection, classification, and/or identification thereof.

SUMMARY

Computing systems may provide and make available over a communication network various resources for use by client software on client devices. These resources may include data, software applications, software services, and other computing resources. For example, a computing system may provide geographic data that indicates the coordinates of various landmark locations within a digital map. The same or another computing system may also provide functions that determine landmark locations within a threshold distance of a set of coordinates within the digital map. Such resources may be exposed by computing systems in a network so that client devices (e.g., other computing systems or aspects thereof) are able to access these resources without having to re-implement another version of these resources. The resources may be exposed through one or more interfaces, sometimes referred to as application programming interfaces, that define the manner, format, standards, and/or rules in which these resources are configured to accept inputs and generate outputs.

However, as the interfaces for a particular resource change over the course of development and improvement of this resource, the client software that consumes this resource may also need to be updated to account for these changes. As more client devices utilize a particular resource, the amount of effort needed to keep the software of these client devices consistent with any updates to the resource may increase. Notably, such effort may be put forth to maintain an aspect of the functionality of the client device operational after the change in the resource, but might not generate additional functionality.

An application programming interface (API) proxy may provide a way to more efficiently manage changes in a resource used by multiple computing systems. The API proxy may serve as an intermediary between the resource and the client devices that utilize this resource. The API proxy may be configured to receive communications from the client devices, modify these communications to account for any differences in the formats, standards, protocols, and/or rules between the client devices and the resources, and provide the modified communications to the resources. The API proxy may similarly receive, modify, and provide the response from the resources to the client devices. As the interfaces of any of the resources change, the API proxy may be modified to account for these changes while keeping the interface exposed by the API proxy to the client device unchanged.

The API proxy may expose the resources to client devices by way of one or more proxy URLs. Each of the proxy URLs may be mapped or assigned by the API proxy to one or more corresponding target URL that addresses one or more particular resources. Using this assignment, the API proxy may determine what resource to provide in response to a request addressed to a given proxy URL. In this way, the API proxy may be used to provide access to a plurality of resources, which may be disposed within a managed network, within a remote network management platform that manages the managed network, or within one or more third-party networks. Since the API proxy integrates together a plurality of systems, discovery and mapping of these systems may leverage the data stored by the API proxy to more accurately determine and represent the relationships among these systems.

To that end, a discovery application may be configured to discover and map aspects of the API proxy and its relationships with other devices and services within the managed network. In one example, the discovery application may be provided with or may determine one or more of the proxy URLs to be mapped. Using these URLs, the discovery application may generate and transmit, to the API proxy, a command configured to cause the API proxy to generate data that represents the assignment or mapping of proxy URLs to target URLs. From this assignment the discovery application may select the target URLs assigned to the proxy URLs that were provided to or determined by the discovery application. The discovery application may then generate a mapping that links the proxy URLs to the target URLs and their corresponding resources, thereby indicating the specific resource that each proxy URL ultimately accesses. The mapping may also indicate the entity or network that provides these resources.

The discovery application may also be configured to determine how the API proxy operates within the context of one or more services. That is, the discovery application may be configured to determine whether a particular service associated with the managed network utilizes the API proxy and, if so, what resources are utilized by this service. To that end, the discovery application may be provided with an entry point for a service, which may be a URL used by client devices to access the service. The service may be hosted on a server device and provided by a server application configured to execute on this server device. A configuration file associated with the server application may contain an indication that the server application utilizes the API proxy to provide at least one aspect (e.g., resource) of the service.

Thus, the discovery application may be configured to search directories of the server device for this configuration file and parse the configuration file to identify therein one or more proxy URLs by way of which the server application accesses the API proxy. The discovery application may use the proxy URLs to obtain, from the API proxy, the assignment of proxy URLs to target URLs, select the target URLs corresponding to the one or more proxy URLs identified in the configuration file, and generate a corresponding mapping. This mapping may reflect the service that utilizes the API proxy, the proxy URLs used by the service, the corresponding target URLs, and the resources addressed by the target URLs.

The discovery application may also be configured to generate and store a cache file that contains the assignment of proxy URLs to target URLs provided by the API proxy.

The cache file may indicate a time at which the stored data was generated by the API proxy. Notably, the discovery application may be configured to update the mapping of a particular service with a greater frequency (e.g., multiple times per day) than the API proxy is expected to be updated (e.g. once per month). The cache file may thus allow the mapping to be updated without incurring costs associated with re-acquiring, from the API proxy, information that is unlikely to have changed since the last mapping operation.

The cache file may also be used to determine the mapping of other services that use the API proxy. That is, the cache file generated during mapping of the particular service may contain the assignment of proxy URLs that are not used by the particular service, but are used by other services. Thus, when one of these other services is being mapped, the assignment between proxy URLs and target URLs used by this other service may already be reflected in the cache file without needing to be acquired from the proxy URL.

Thus, the discovery application may be configured as part of the mapping operations to search for and identify the cache file. When the time stored in the cache file does not exceed a predetermined among of time, indicating that the data stored therein is not stale, the discovery application may determine the assignment between proxy URLs and target URLs using the data in the cache file (provided this data is present in the file). When the cache file does not exist, or the time indicated by the cache file indicates that the data is stale, the discovery application may be configured to communicate with the API proxy to obtain the data indicating the assignment between proxy URLs and target URLs.

Accordingly, in a first example embodiment, a method includes determining, by a discovery application, a proxy URL used to provide access to a particular resource of a plurality of resources through an API proxy of one or more API proxies associated with a managed network and configured to provide access to the plurality of resources. The method also includes obtaining, by the discovery application and from a computing device associated with the API proxy, an assignment of one or more proxy URLs to one or more corresponding target URLs by the API proxy. Each target URL of the one or more corresponding target URLs addresses a respective resource of the plurality of resources. The one or more proxy URLs are used to provide access to the plurality of resources through the API proxy. The method additionally includes selecting, by the discovery application and from the assignment, a target URL assigned to the proxy URL used to provide access to the particular resource through the API proxy. The method further includes generating, by the discovery application, a mapping between the proxy URL and the target URL. The method yet further includes storing, in a configuration management database (CMDB) disposed within a computational instance of a remote network management platform, the mapping in one or more configuration items. The computational instance is associated with the managed network.

In a second example embodiment, a computing system includes a CMDB disposed within a computational instance of a remote network management platform. The computational instance is associated with a managed network. One or more API proxies associated with the managed network provide access to a plurality of resources. The computing system also includes a discovery application configured to perform operations including determining a proxy URL used to provide access to a particular resource of the plurality of resources through an API proxy of the one or more API proxies. The operations also include obtaining, from a computing device associated with the API proxy, an assignment of one or more proxy URLs to one or more corresponding target URLs by the API proxy. Each target URL of the one or more corresponding target URLs addresses a respective resource of the plurality of resources. The one or more proxy URLs are used to provide access to the plurality of resources through the API proxy. The operations additionally include selecting, from the assignment, a target URL assigned to the proxy URL used to provide access to the particular resource through the API proxy. The operations further include generating a mapping between the proxy URL and the target URL. The operations yet further include storing, in the CMDB, the mapping in one or more configuration items.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
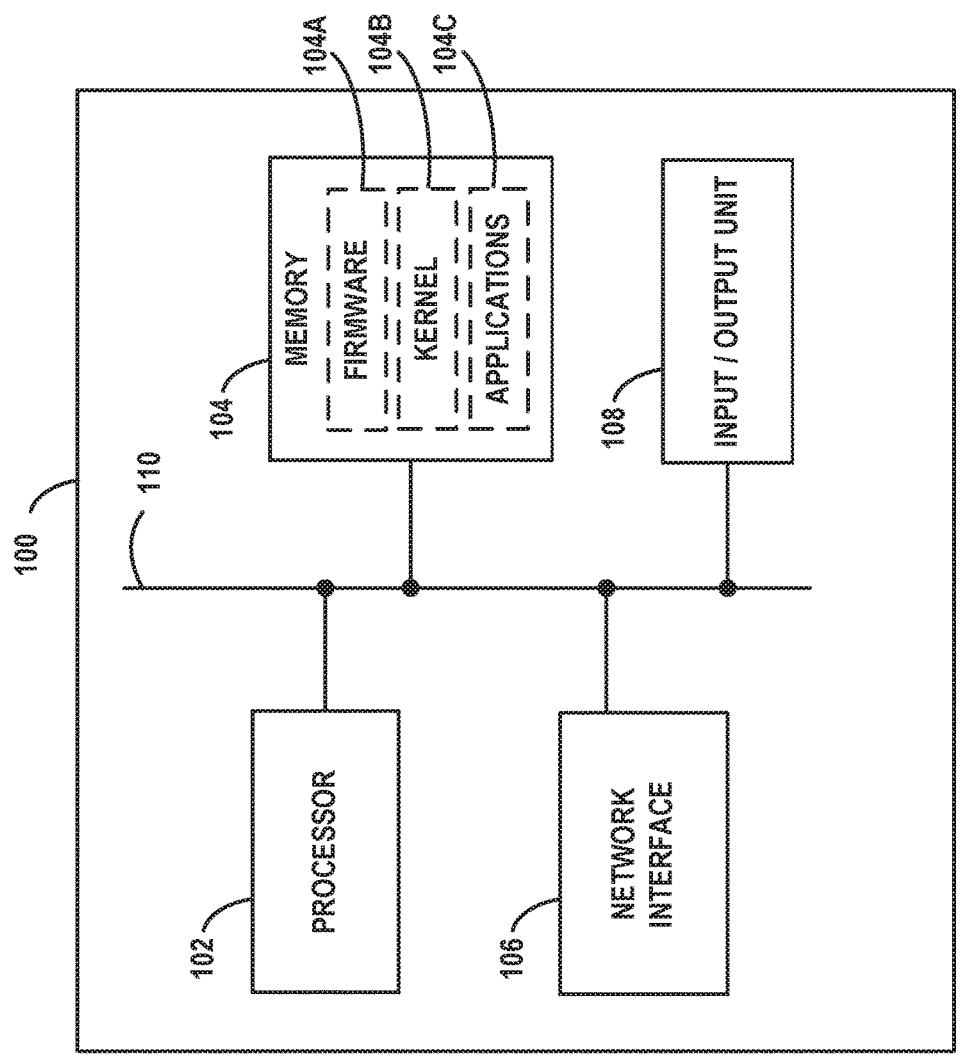
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
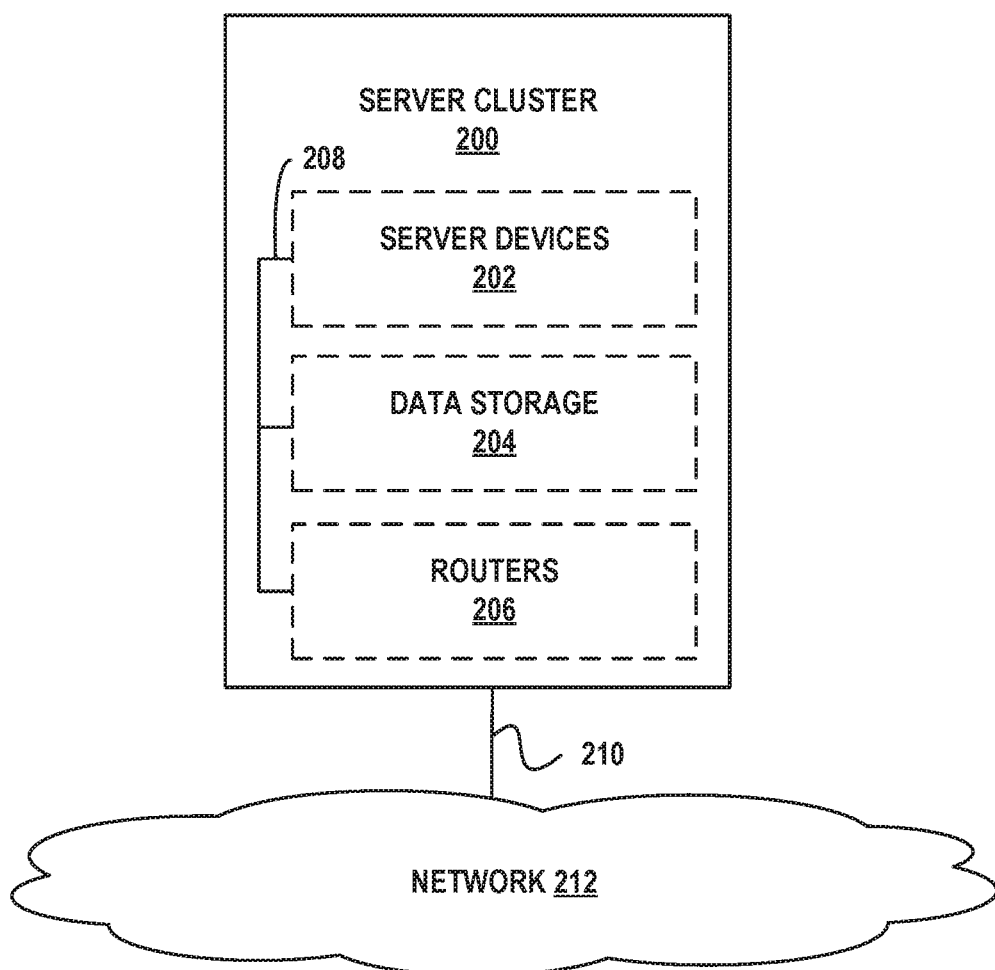
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
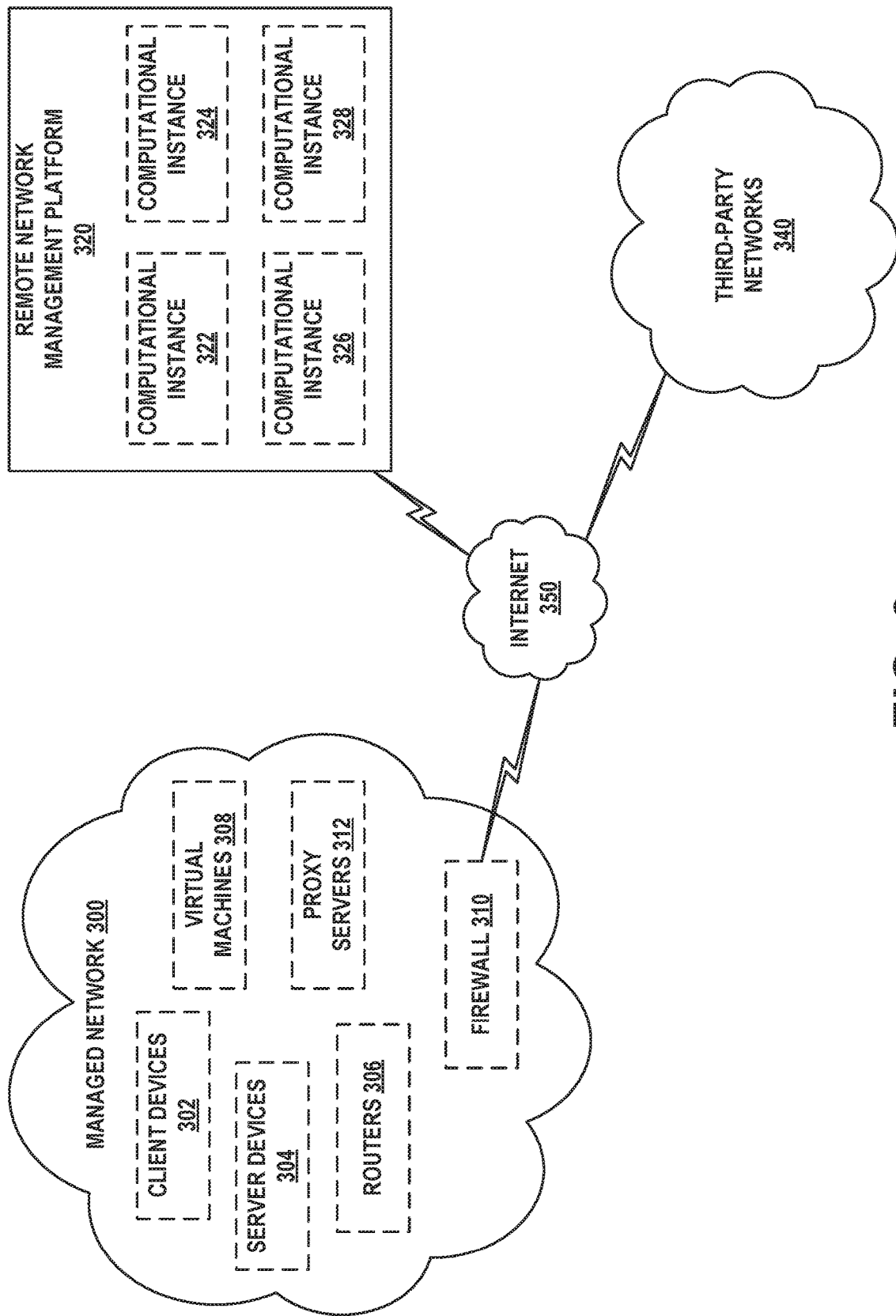
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents commingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
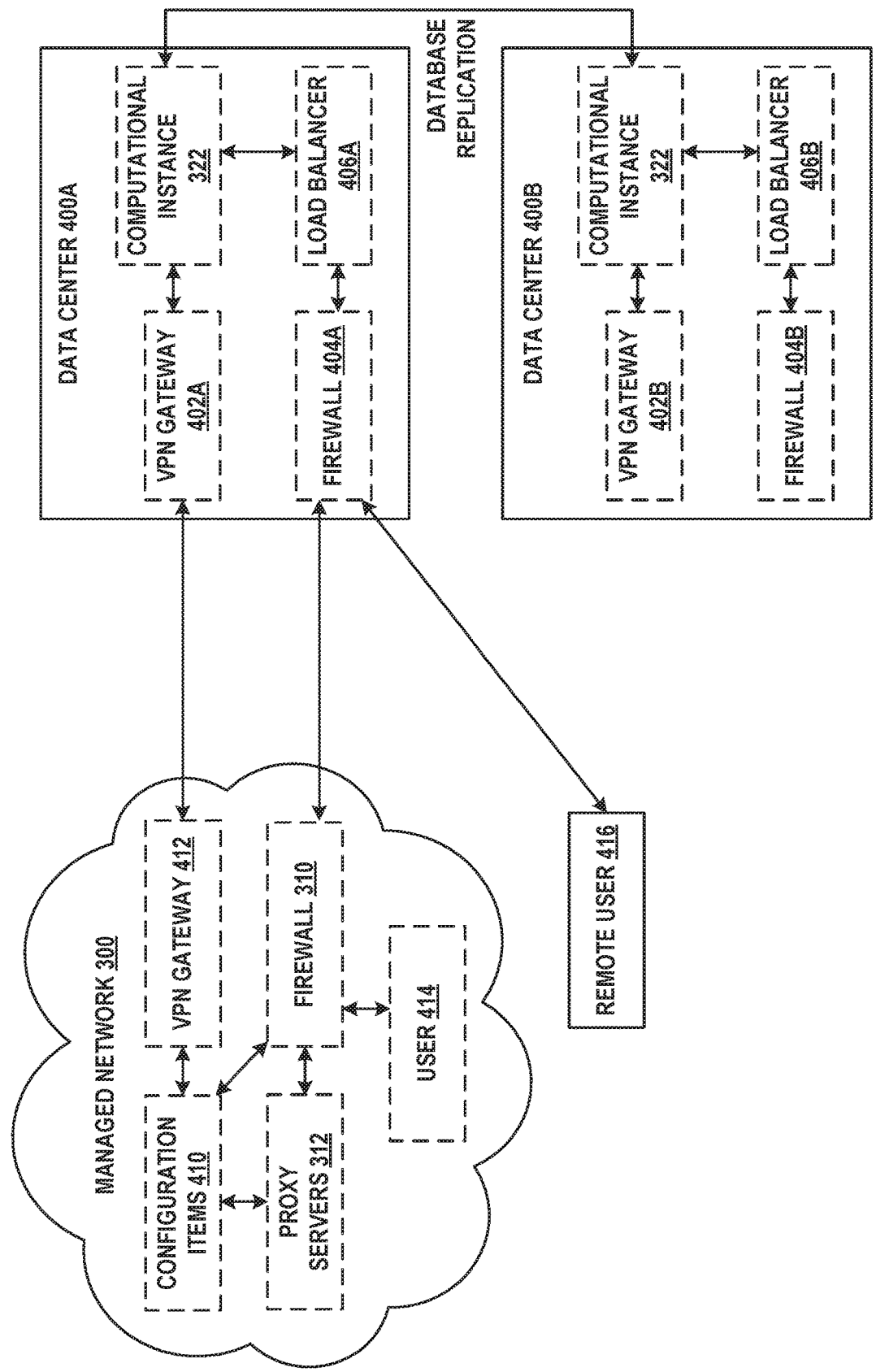
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
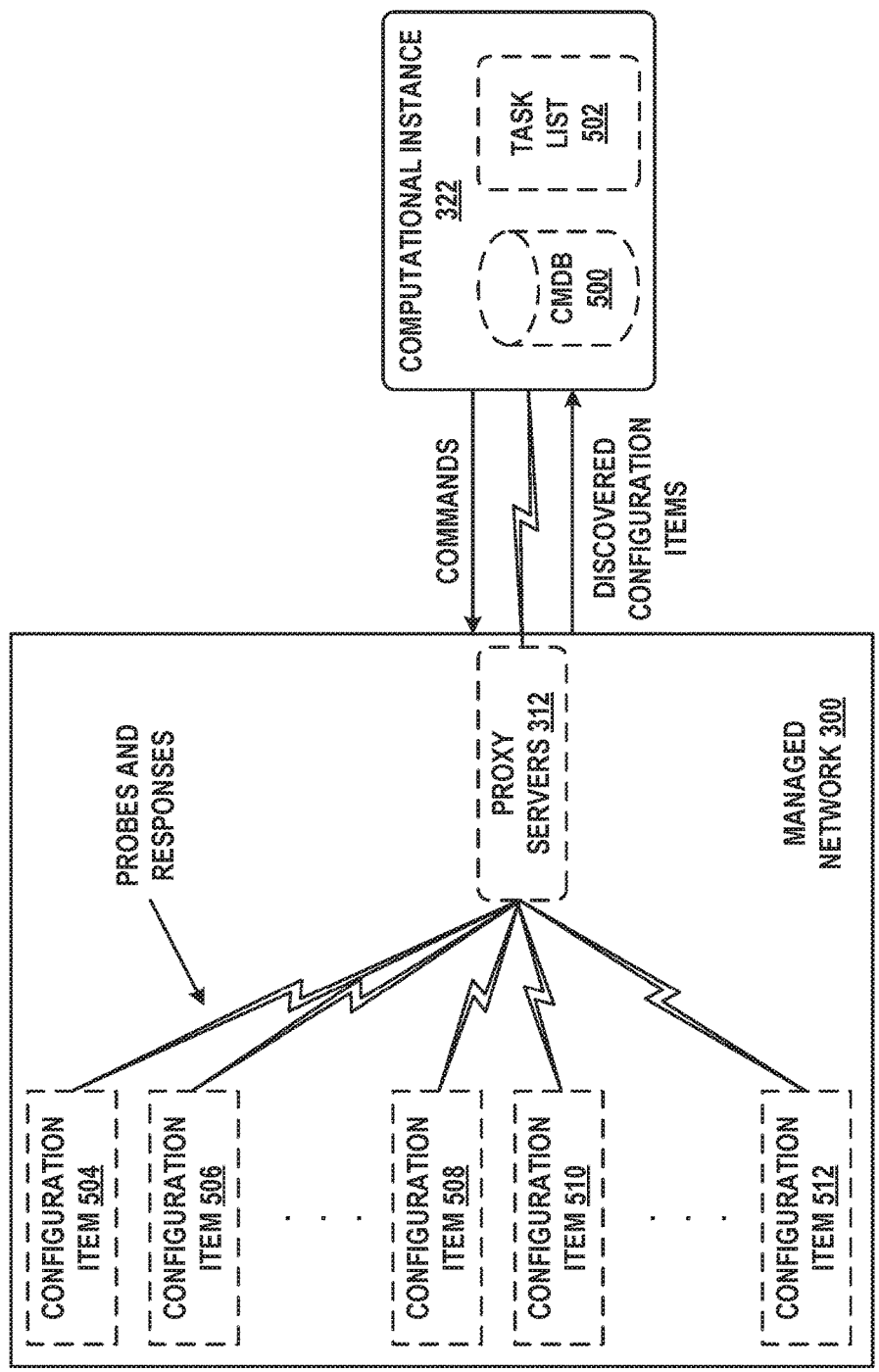
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
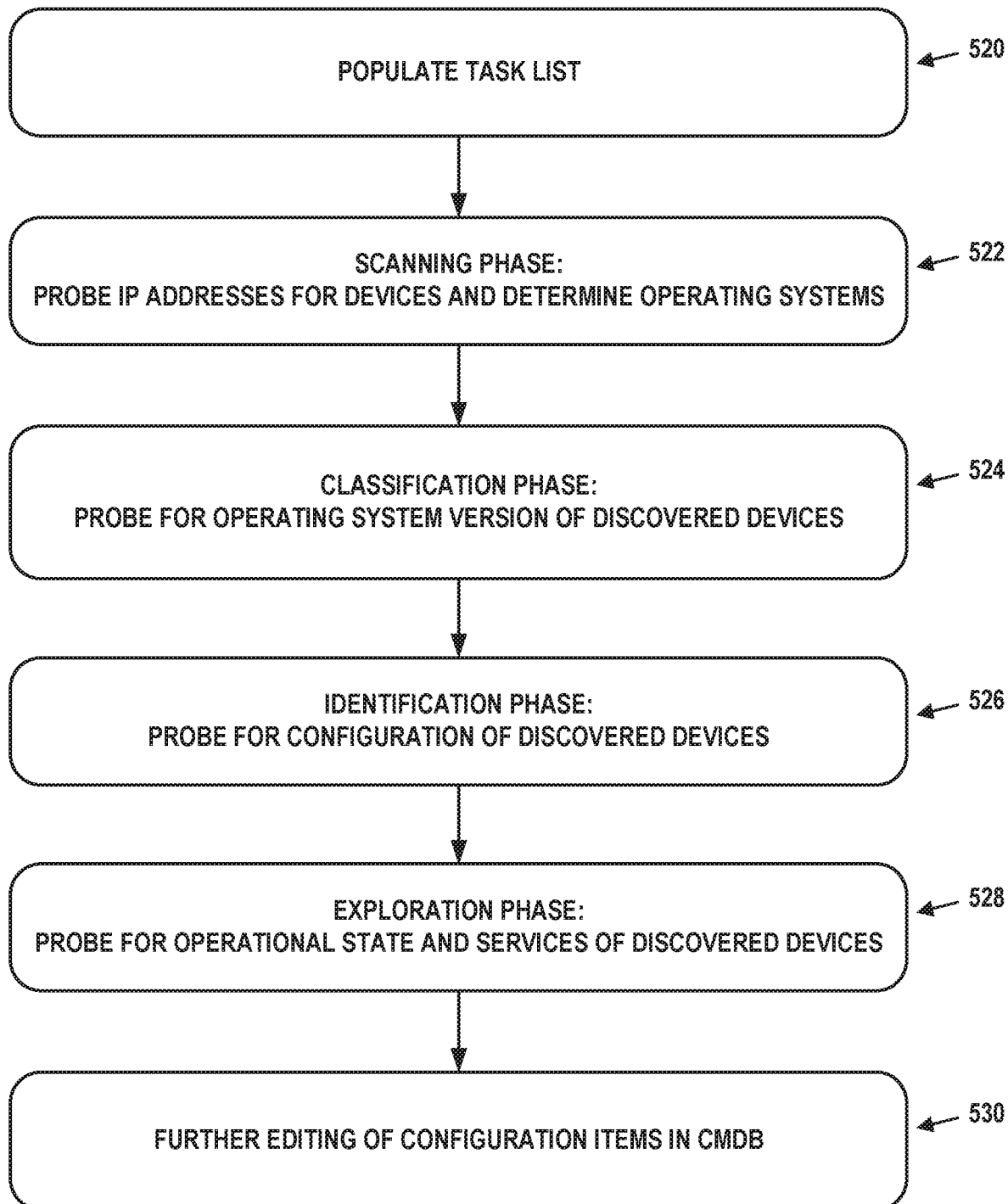
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example API Proxy System

An API proxy facilitates the consumption of various back-end computing resources by client software and allows these back-end computing resources to be exposed in a scalable fashion. Namely, as the resources and their interfaces change over time, the API proxy can be updated to maintain compatibility between the resources and the client software without having to modify the client software. When an API proxy is utilized by a managed network to provide and access these resources, some of the relationships between the resources and aspects of the managed network might not be readily apparent to client devices. That is, when client software sends a request to a particular proxy URL, the API proxy may redirect this request to a target URL without informing the client software of this redirect. These relationships may nevertheless be reflected in the data that stores the rules according to which the API proxy is configured to carry out its operations. Accordingly, a discovery application may be configured to access this data in order to generate a mapping that reflects the relationships between the API proxy and the various aspects of a managed network.

Figure 6:
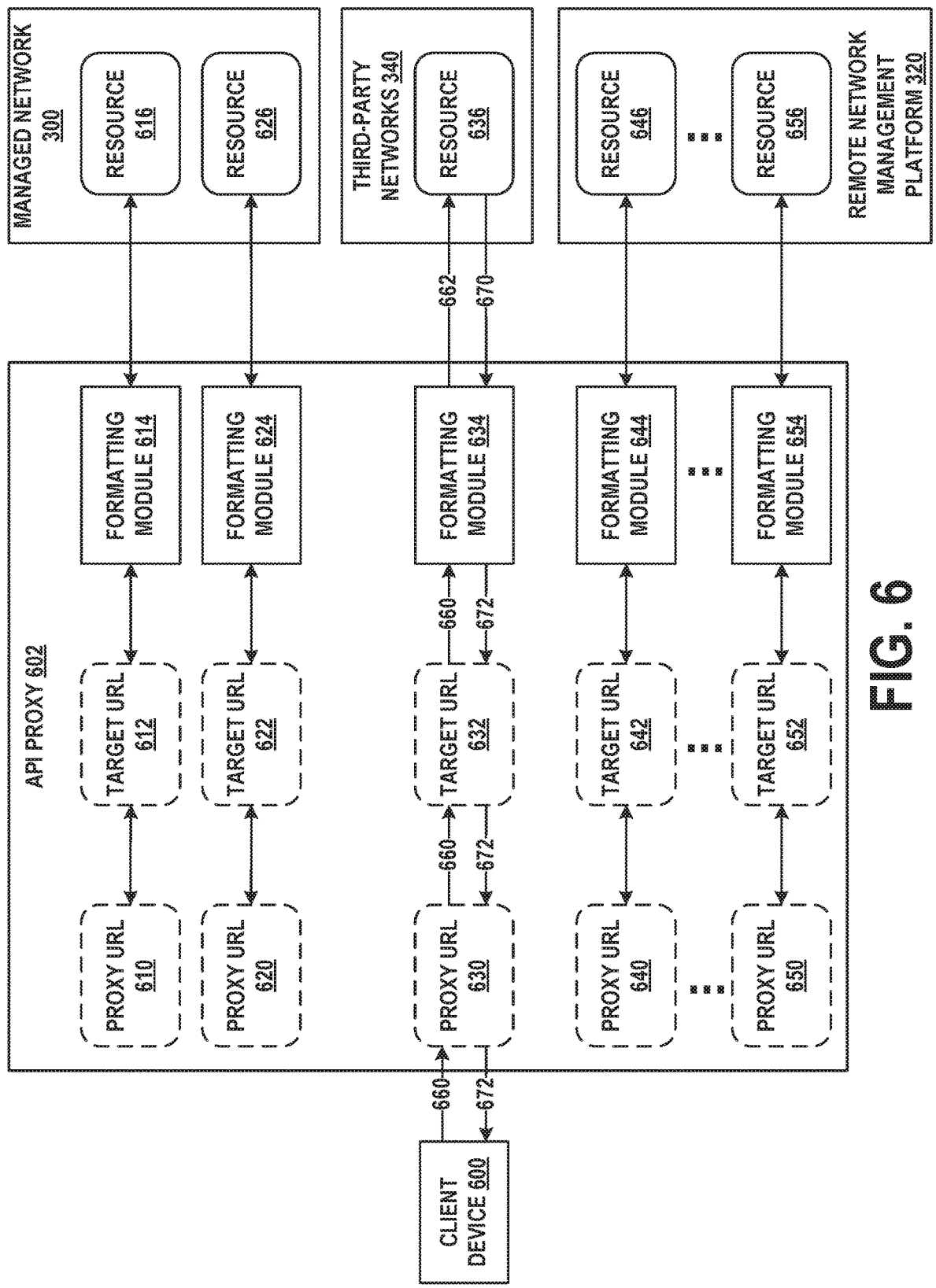
FIG. 6 illustrates an application programming interface proxy, in accordance with example embodiments.

FIG. 6 illustrates an example system that uses an API proxy to connect client devices to various resources. The system includes client device 600, API proxy 602, and resources 616, 626, 636, 646, and 656 (i.e., resources 616-656). Client device 600 may represent, for example, computing device 100 executing client software configured to communicate with API proxy 602. API proxy 602 may be hosted or provided by one or more computing devices (e.g., server cluster 200). Resources 616-656 represent any computing resources that can be obtained via the Internet, including, for example, web pages, information in databases, files, and web services, among others. Resources 616-656 may thus represent various back-end services or portions thereof provided by various computing devices accessible via the Internet.

Resources 616-656 may be distributed among a plurality of different networks. For example, resources 616 and 626 may be disposed in and provided by managed network 300, resource 636 may be disposed in and provided by third-party networks 340, and resources 646 and 656 may be disposed in and provided by remote network management platform 320.

API proxy 602 provides a mechanism for client device 600 to access resources 616-656 indirectly. That is, rather than connecting to one or more of resources 616-656 directly, client device 600 may access these resources by way of API proxy 602. To that end, API proxy 602 may expose a plurality of proxy URLs 610-650 (i.e., proxy URLs 610, 620, 630, 640, and 650). Each of proxy URLs 610-650 may be mapped or assigned to a corresponding one or more of target URLs 612-652 (i.e., URLs 612, 622, 632, 642, and 652). Namely, proxy URL 610 may be assigned to target URL 612, proxy URL 620 may be assigned to target URL 622, proxy URL 630 may be assigned to target URL 632, proxy URL 640 may be assigned to target URL 642, and proxy URL 650 may be assigned to target URL 652. Notably, although not shown in FIG. 6, in some implementations, each proxy URL may be assigned to two or more target URLs. A request to such a proxy URL may thus return a combination and/or transformation of the resources from the two or more target URLs.

API proxy 602 may be configured to receive, from various client devices (e.g., client device 600), requests addressed to one or more of the proxy URLs 610-650 and forward the requests to a corresponding one or more of target URLs 612-652. In some cases, the requests may be forwarded without any modification. Alternatively, however, API proxy 602 may modify the requests according to any differences in the protocols, standards, formatting, or other rules according to which the client devices and resources 616-656 communicate. Thus, API proxy 602 may include formatting modules 614, 624, 634, 644, and 654 (i.e., formatting modules 614-654) configured to monitor and modify the data exchanged between the client devices and resources 616-656 to integrate these communication endpoints together.

Namely, formatting module 614 may be configured to modify requests and responses exchanged between client devices and resource 616. Formatting modules 624, 634, 644, and 654 may perform a similar function for resources 626, 636, 646, and 656, respectively. For example, client device 600 may be configured to provide data in JavaScript Object Notation (JSON) format when accessing resource 636 by way of API proxy 602. Thus, client device 600 may transmit request 660 addressed to proxy URL 630. Based on the assignment of proxy URL 630 to target URL 632, which addresses resource 636, request 660 may be modified by formatting module 634 into a format that resource 636 uses (e.g., XML). Thus, the data of request 660 may be transformed into the XML format, and a modified request 662 may be sent by API proxy 602 to resource 636 on behalf of client device 600.

In response, resource 636 may generate response 670, which may contain data formatted according to the XML format. Formatting module 634 may transform this data from the XML format to the JSON format and transmit modified response 672 back to client device 600. In another example, a resource that takes input parameters as HTTP headers may be exposed by API proxy 602 to client devices as a representational state transfer (REST) API that takes input parameters as query parameters embedded in the URL. When resource 636 is modified, rather than each client device having to conform to this modification, formatting module 634 or other aspects of API proxy 602 may be modified to allow the client devices to continue using resource 636. Accordingly, API proxy 602 may facilitate the consumption of resources 616-656.

Additionally, in some implementations, API proxy 602 may provide additional functionality such as, for example, limiting the rate at which client devices are able to access resources 616-656, enforcing a quota beyond which client devices might not be able to access resources 616-656, providing various security features, and tracking usage of resources 616-656. API proxy 602 may represent, for example, APIGEE EDGE®. API proxy 602 may be hosted by managed network 300, by remote network management platform 320, a third-party provider, or a combination thereof. APIGEE EDGE®, for example, may be hosted by server devices provided by the APIGEE®, or may be installed on server devices within managed network 300.

VII. Example Discovery of an API Proxy

API proxy 602 may be used by managed network 300 to facilitate the usage of resources 616-656 by various client devices both inside and outside of managed network 300. To that end, API proxy 602 may be integrated with or used by various applications and services within managed network 300. A discovery application may be configured to discover API proxy 602 and determine its relationships with other components of managed network 300, thereby allowing the state of managed network 300 to be accurately visualized over time.

Figure 7:
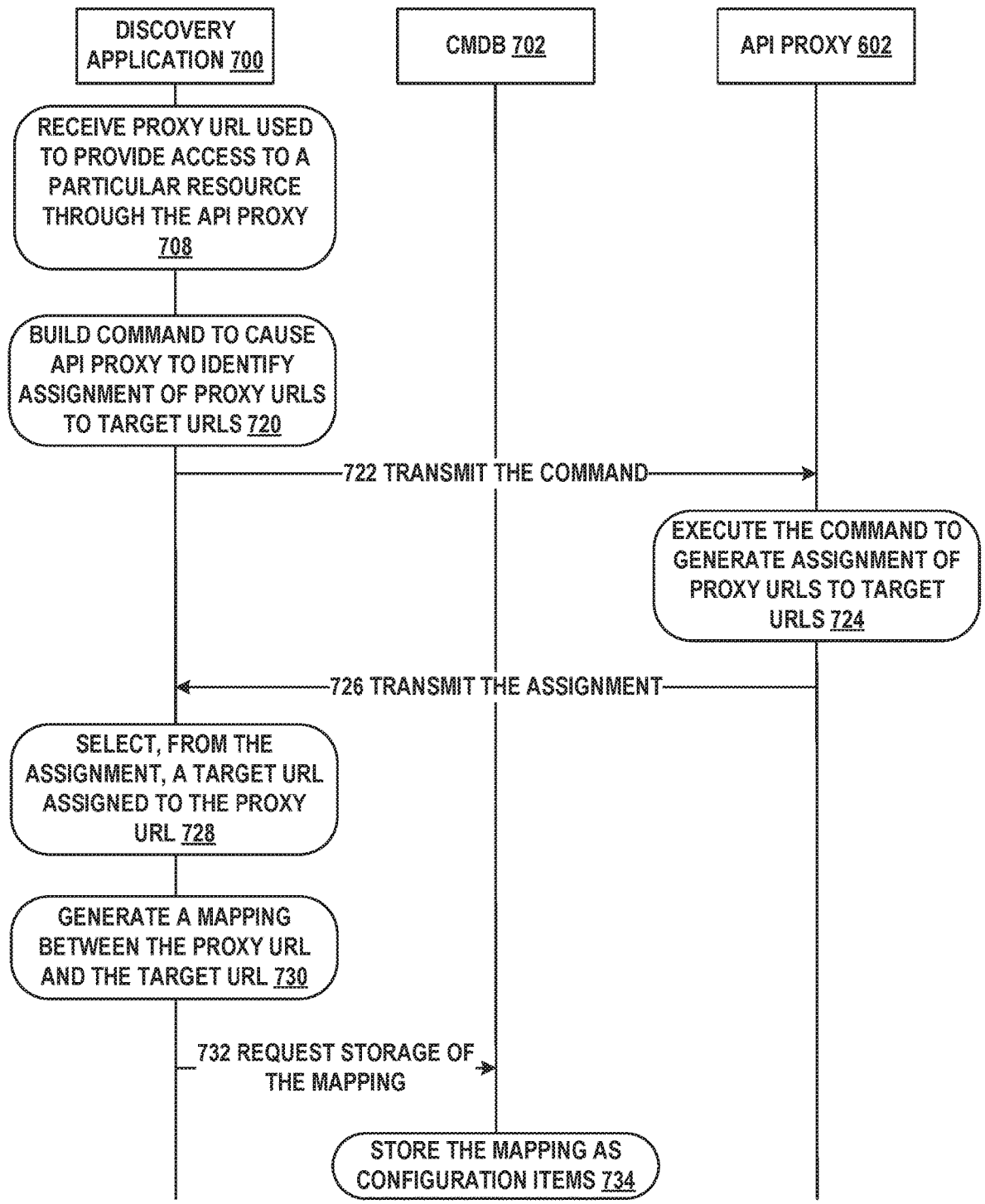
FIG. 7 illustrates a message flow diagram, in accordance with example embodiments.

Accordingly, FIG. 7 illustrates an example process for discovering API proxy 602 and various attributes thereof. Notably, FIG. 7 illustrates a discovery process in which one of the proxy URLs made available by API proxy 602 is provided to discovery application 700 as an entry point in order to initiate the discovery process. That is, discovery application 700 may be configured to receive an indication of a proxy URL used by one or more client devices to provide access to a particular resource through the API proxy, as indicated by block 708.

The proxy URL may be provided, for example, by way of a user interface associated with discovery application 700. The user interface may allow for provision or specification of (i) one or more services, including API proxy 602, to be discovered and (ii) one or more parameters to be used during discovery of the one or more services. The parameters may include, for example, login credentials, access tokens (e.g., JSON Web Tokens), and URLs or other endpoints associated with the services to be discovered.

Based on or in response to receiving the proxy URL at block 708, discovery application 700 may be configured to build a command configured to cause API proxy 602 to identify the assignment of proxy URLs (e.g., proxy URLs 610-650) to target URLs (e.g., target URLs 612-652), as indicated by block 720. API proxy 602 may store this assignment, or mapping, in one or more files, databases, or other repositories. The assignment may be accessible to computing devices and/or software applications (e.g., discovery application 700) by way of a web-based interface. For example, the assignment may be accessible by way of a REST query to API proxy 602. Thus, the command built by discovery application 700 may include a URL that addresses API proxy 602 and specifies the repository of API proxy 602 that stores the desired assignment.

For example, the command may be "curl -X GET htttp://APIproxyURL.com/URLAssignmentPath -H 'Credentials: credentials value'." "Curl" may specify a command line software application configured to transfer data between two or more computing devices using a specified protocol which, in this case, is HTTP. The "-X" parameter specifies the type of HTTP request that is to be transmitted which, in this case, is a GET request. "http://APIproxyURL.com" may be the proxy URL received at block 708, or a portion thereof, while "URLAssignmentPath" may be a file system path that specifies the repository in which the assignment of Proxy URLs to target URLs is stored by API proxy 602. Finally, the "-H" parameter may specify an HTTP header to be provided as part of the REST query, which in this case specifies the credentials (i.e., in header field "Credentials" having value "credentials value") to be used to gain access to the repository where API proxy 602 stores the assignment. The credentials may take the form of, for example, a username and password or an access token, among other possibilities.

Based on or in response to building or generating the command at block 720, discovery application 700 may be configured to transmit the command to API proxy 602, as indicate by arrow 722. In the example above, transmission of the command may be facilitated by the "curl" command, which may format the provided parameters into an HTTP request and transmit the request to API proxy 602. In alternative implementations, however, the command may be transmitted by discovery application 700 directly, without involving other software applications. The transmission may also use a protocol other than HTTP.

Based on or in response to receiving the command at arrow 722, API proxy 602 may be configured to execute the command in order to generate the assignment of proxy URLs to target URLs, as indicated by block 724. Executing the command may involve accessing the repository in which the assignment is stored and formatting the data that represents the assignment according to a particular format (e.g., JSON, XML, etc.). In one example, executing the command may generate data that reflects the target URLs assigned to each of the proxy URLs that API proxy 602 is configured to handle. That is, the data may include the entire repository. Alternatively, executing the command may generate a subset of this data, and the subset can be specified as part of the command transmitted at arrow 722. Based on or in response to executing the command at block 724, API proxy 602 may be configured to transmit the assignment to discovery application 700, as indicated by arrow 726.

In some embodiments, additional commands may be generated by discovery application 700 and transmitted to API proxy 602 to obtain other information about API proxy 602. For example, discovery application 700 may determine the name assigned to API proxy 602, the version of API proxy 602, the directory in which API proxy 602 is installed on a particular computing device, and the configuration directory in which API proxy 602 stores its configuration files, among other attributes.

Based on or in response to receiving the assignment at arrow 726, discovery application 700 may be configured to select, from the assignment, a target URL that is assigned to the proxy URL. For example, when the URL specified at block 708 is proxy URL 640, discovery application may select target URL 642 corresponding thereto. Specifically, the assignment may be parsed for proxy URL 640, which may, in turn, be associated or otherwise mapped to target URL 642. Based on or in response to selecting the target URL at block 728, discovery application 700 may be configured to generate a mapping between the proxy URL (e.g., 640) and the target URL (e.g., 642), as indicated by block 730. Notably, because target URL 642 addresses resource 646, the mapping may also indicate, either directly or implicitly, a relationship between proxy URL 640 and resource 646.

Based on or in response to generating the mapping at block 730, discovery application 700 may be configured to transmit, to CMDB 702, a request for storage of the mapping, as indicated by arrow 732. Based on or in response to this request at arrow 732, CMDB 702 may be configured to store the mapping as one or more configuration items, as indicated by block 734. The operations of FIG. 7 may be repeated for other proxy URLs. Accordingly, the mappings may be retrievable by various computing devices and used to visualize the relationships between proxy URLs 610-650, target URLs 612-652, and resources 616-656.

CMDB 702 may be disposed within a computational instance of remote network management platform 320. This computational instance may be assigned to or associated with managed network 300. The computational instance may thus also be associated with API proxy 602 due to its use by managed network 300. Alternatively, CMDB 702 may be disposed within managed network 300 or within a third-party network associated with managed network 300.

In some implementations, API proxy 602 may also be discovered and mapped without an explicit identification of proxy URL at block 708. Specifically, when API proxy 602 is executing on a computing device within managed network 300, for example, discovery application 700 may be configured to discover API proxy 602 based on a running software process corresponding to API proxy 602 or based on one or more directories in which API proxy 602 stores its files on this computing device. Discovery application 700 may obtain the data representing the assignment between proxy URLs and target URLs and generate a mapping thereof. Notably, this mapping may represent all proxy URLs that address API proxy 602 and the target URLs corresponding thereto, thereby illustrating all resources available via API proxy 602, regardless of whether these resources are or are not actively used by client devices or services within managed network 300.

VIII. Example Discovery of API Proxy Through Services

Figure 8:
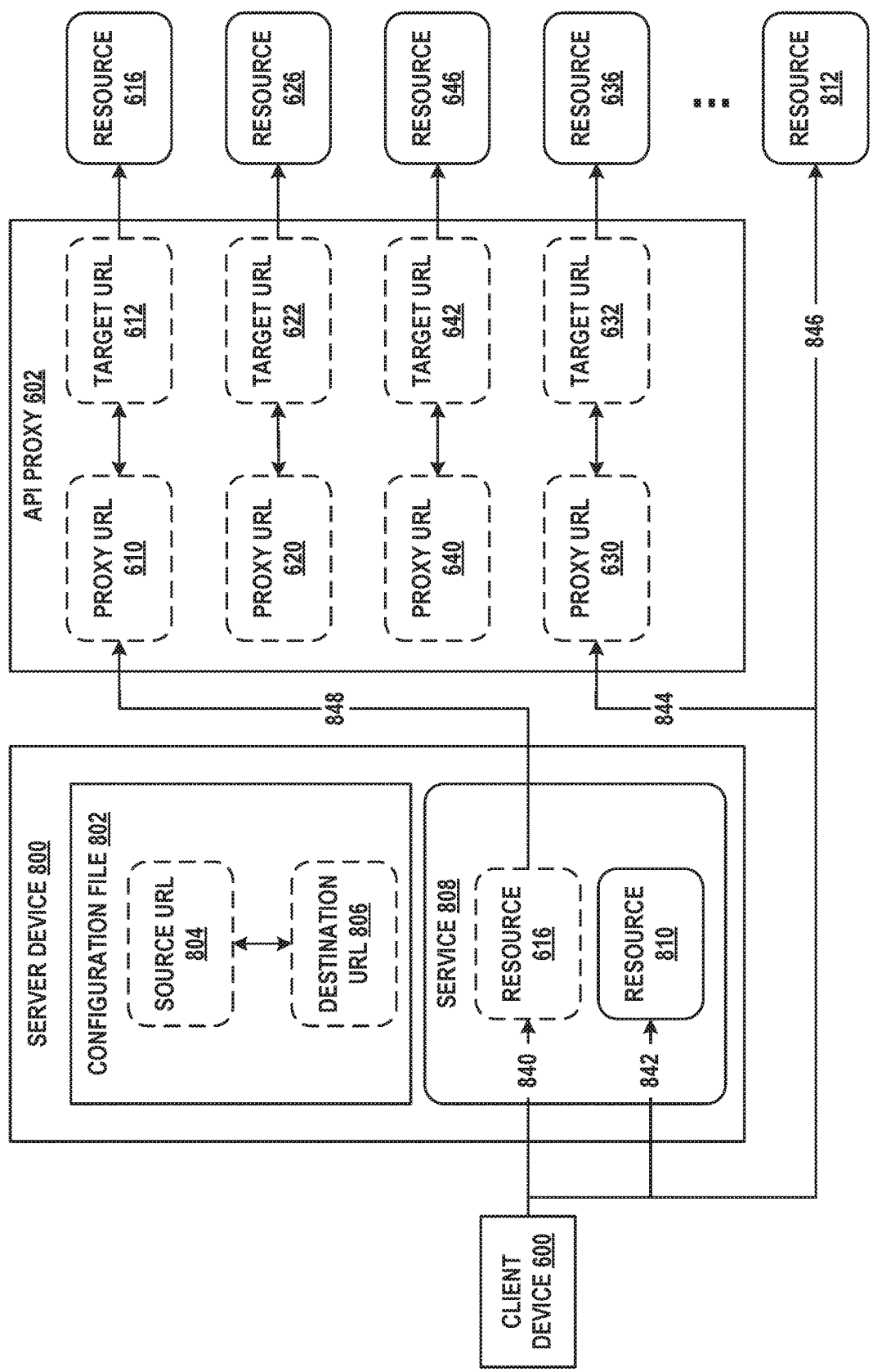
FIG. 8 illustrates an application programming interface proxy accessed by a service, in accordance with example embodiments.

In addition to discovering API proxy 602 and determining a mapping of the proxy URLs to target URLs and corresponding resources, discovery application 700 may be used to determine how API proxy 602 is utilized by or in the context of one or more services. Notably, proxy URLs 610-650 might not always be called by client device 600 directly. Rather, as illustrated in FIG. 8, client device 600 may call a service that, in turn, utilizes API proxy 602 to obtain at least a portion of the resources involved in providing the functionality of this service.

Namely, API proxy 602 may be utilized by service 808, which may be hosted on server device 800. In one example, server device 800 may be disposed within managed network 300. Alternatively, however, server device 800 may be disposed within remote network management platform 320 or third-party network 340. Service 808 may utilize and/or provide resources 616 and 810 to client device 600. Resource 810 may be stored on and provided by server device 800 directly, as illustrated by arrow 842. On the other hand, resource 616 may be accessed through API proxy 602 by way of proxy URL 610, as indicated by arrows 840 and 848.

In one example, resource 810 may represent payroll data (e.g., monthly salary per payroll recipient) and resource 616 may represent a software application configured to calculate payroll tax payable for a given amount of monthly salary. Service 808 may thus determine the payroll tax for one or more payroll recipient and expose this data to client device 600. Other services that perform different operations and use a different number and type of resources are possible.

Notably, client device 600 may also be able to access resource 636 through API proxy 602 without utilizing service 808, as indicated by arrow 844. Client device 600 may further be able to access resource 812 directly, without utilizing either API proxy 602 or service 808, as indicated by arrow 846.

In the absence of discovery application 700 supporting discovery of API proxy 602, both resource 616 and resource 810 might appear as if they are provided by service 808 on server device 800. In other words, it might not be apparent from the perspective of client device 600 that a portion of the data used and/or provided by service 808 is obtained from server device 800 and another portion is obtained from another server device that hosts resource 616. Thus, an accurate map of the resources utilized by service 808 might be difficult to determine.

However, discovery application 700 may be configured to determine that service 808 utilizes API proxy 602 and identify the specific resources accessed by service 808 through API proxy 602, thereby allowing for an accurate mapping of the resources utilized by service 808. Specifically, discovery application 700 may determine that service 808 utilizes API proxy 602 based on the contents of configuration file 802 stored in server device 800. Configuration file 802 may be associated with a server application (e.g., NGINX®) provided on server device 800 and configured to provide service 808. Configuration file 802 may store therein various settings, parameters, and attributes indicating how the server application is configured to operate.

Notably, configuration file 802 may contain a mapping or assignment between source URL 804 and destination URL 806. Source URL 804 may be a URL associated with service 808. In one example, source URL 804 may be the URL used by client device 600 to access service 808 or, specifically, resource 616. The assignment or mapping between source URL 804 and destination URL 806 may indicate to the server application that, in response to receiving a request addressed to source URL 804, the server application is to obtain the resource addressed by destination URL 806. In the context of service 808, destination URL 806 may be the same as proxy URL 610, which in turn leads to resource 616.

Accordingly, in one implementation, client device 600 may access service 808 using source URL 804. Upon receiving, from client device 600, a request addressed to source URL 804, the server application may be configured to (i) provide resource 810 to client device 600, (ii) obtain resource 616 by transmitting another request to API proxy 602, and (iii) provide resource 616 to client device 600 upon its receipt via API proxy 602.

In an alternative implementation, client device 600 may access resource 616 by using source URL 804, and resource 810 by using another different URL. That is, upon receiving, from client device 600, a request addressed to source URL 804, the server application may be configured to obtain resource 616 by forwarding the request to API proxy 602. Resource 616 may be provided to client device 600 upon its receipt via API proxy 602. Upon receiving a request addressed to the another URL, the server application may be configured to provide resource 810. In either case, the mapping between source URL 804 and destination URL 806 in configuration file 802 may indicate a relationship between service 808 and API proxy 602 that may be used to determine and map relationships between API proxy 602 and service 808, among other discoverable elements of managed network 300.

Figure 9:
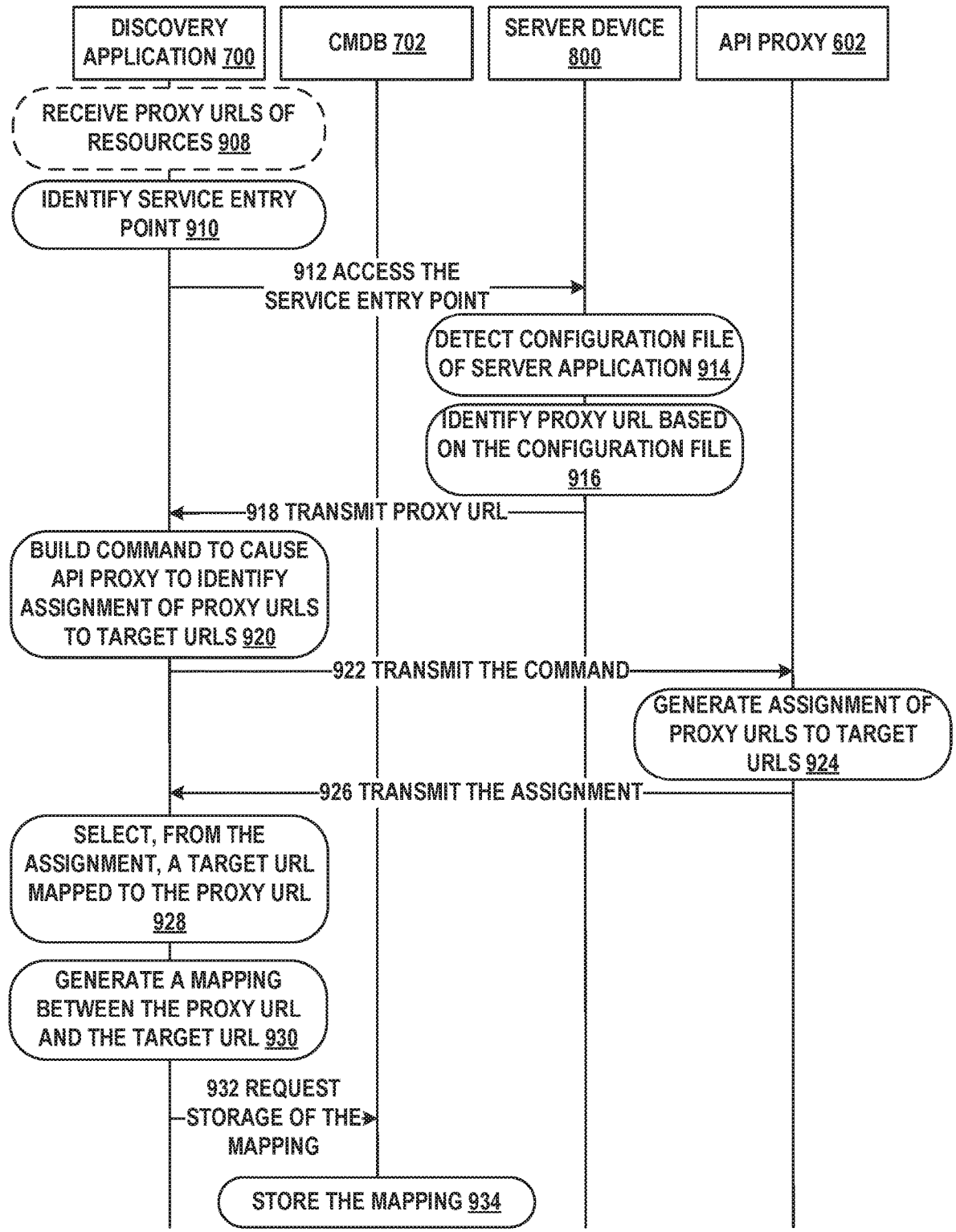
FIG. 9 illustrates a message flow diagram, in accordance with example embodiments.

Accordingly, FIG. 9 illustrates an example process for discovery and mapping of API proxy 602 in the context of software services. In some implementations, discovery application 700 may optionally receive one or more proxy URLs used to provide access to corresponding one or more resources through the API proxy, as indicated by block 908. The operations of block 908 may be similar to those of block 708 in FIG. 7. Receiving the one or more proxy URLs may configure discovery application 700 to discover and map these proxy URLs in the context of a service while ignoring other proxy URLs that, although used by the service, might be of less interest or importance. Notably, however, discovery application 700 may alternatively be configured to discover and map API proxy 602 and the URL assignments thereof without ignoring the other proxy URLs.

Discovery application 700 may be configured to identify an entry point for a service to be discovered and/or mapped, as indicated by block 910. In one example, the entry point may be provided by way of a user interface along with an indication of the service to be discovered and/or mapped. The entry point may be a URL used to access the service (e.g., source URL 804 associated with service 808). In another example, the entry point may be determined by monitoring network traffic of one or more computing devices that host the service and sending various probes to the one or more computing devices.

Based on or in response to identifying the entry point at block 910, discovery application 700 may be configured to access the entry point of the service, as indicated by arrow 912. Accessing the entry point may involve, for example, establishing a secure shell (SSH) connection between discovery application 700 and server device 800, thereby allowing discovery application 700 to cause server device 800 to perform operations on behalf of discovery application 700. In this way, discovery application may be able to access the contents of server device 800 as part of discovery and/or mapping of the services thereon.

Accordingly, based on or in response to successfully accessing the entry point at arrow 912, discovery application 700 may be configured to detect a configuration file (e.g., 802) of a server application that provides the service on server device 800, as indicated by block 914. Discovery application 700 may, for example, be configured to check the contents of a plurality of predetermined directory locations on server device 800 in search of files that have a particular name, name format, or type, among other attributes. Searching directory locations in this way may allow discovery application 700 to determine what application, services, or other resources are provided on server device 800. Detection of the configuration file of the server application may thus indicate that server device 800 has installed thereon and is configured to execute server application.

Based on or in response to detecting the configuration file at block 914, discovery application 700 may be configured to access the configuration file and identify therein a proxy URL, as indicated by block 916. The identified proxy URL may be, for example, destination URL 806 (which is the same URL as proxy URL 610). The proxy URL may be stored in the configuration file in association with one or more keywords or strings that indicate that this URL addresses API proxy 602. For example, the configuration file may map or assign the identified proxy URL to a source URL (e.g., 804), which may represent the entry point of the service identified at block 910.

Additionally, in implementations where a proxy URL is also provided at block 908, the proxy URL contained in the configuration file may be verified against the proxy URL provided at block 908. Thus, discovery application 700 may disambiguate the proxy URL used by the service for which discovery and mapping is being carried out from other proxy URLs associated with other services provided by way of the server application on server device 800. That is, discovery application 700 might not discover and map proxy URLs that are not used by the service undergoing discovery. However, discovery application 700 may discover and map such proxy URLs as part of the discovery and mapping of the services that these proxy URLs are used by.

Based on or in response to identifying the proxy URL at block 916, server device 800 may be configured to transmit, to discovery application 700, the proxy URL along with any other attributes associated with the proxy URL and stored by server device 800, as indicated by arrow 918. Notably, in carrying out the operations of arrow 912, arrow 918, block 914, and block 916, discovery application 700 and server device 800 may be configured to exchange one or more additional requests, responses, or other transmissions not shown in FIG. 7. Based on or in response to receiving the proxy URL at arrow 918, discovery application may be configured to build a command configured to cause API proxy 602 to identify an assignment of proxy URLs to target URLs, as indicated by block 920. The operations of block 920 may be analogous to the operation of block 720 in FIG. 7, with the exception that the proxy URL has now been determined based on the configuration file.

Based on or in response to building the command at block 920, discovery application 700 may be configured to transmit the command to API proxy 602, as indicated by arrow 922. Based on or in response to receiving the command at arrow 922, API proxy 602 may be configured to generate the assignment of proxy URLs to target URLs, as indicated by block 924. Based on or in response to generating the assignment, API proxy 602 may be configured to transmit the assignment to discovery application 700. Notably, the operations of arrows 922 and 926 and block 924 may be analogous to those of arrows 722 and 726 and block 724, respectively.

Based on or in response to receiving the assignment at arrow 926, discovery application 700 may be configured to select, from the assignment, a target URL mapped to the proxy URL identified at block 916 and, optionally, block 908, as indicated by block 928. Based on or in response to selecting the target URL from the assignment, discovery application 700 may be configured to generate a mapping between the proxy URL and the target URL, as indicated by block 930. The operations of blocks 928 and 930 may be analogous to those of blocks 728 and 730.

Additionally, when API proxy 602 is discovered and mapped in the context of a service, the mapping generated at block 930 may additionally indicate a relationship between the proxy URL and the service that calls the proxy URL in order to access the resource addressed by the corresponding target URL. The mapping may thus indicate, for example, that service 808 (accessed by client devices using source URL 804) uses proxy URL 610 to access resource 616.

Based on or in response to generating the mapping at block 930, discovery application 700 may be configured to transmit, to CMDB 702, a request for storage of the generated mapping, as indicated by arrow 932. Based on or in response to receiving the request at arrow 932, CMDB 702 may be configured to store the mapping as one or more configuration items, as indicated by block 934. Notably, the operations of arrow 932 and block 934 may be analogous to those of arrow 732 and block 734, respectively.

IX. Example Caching of API Proxy Information

In some implementations, the discovery and/or mapping process for services may be repeated to determine changes in the services over time. Such repetition of discovery and/or mapping may be triggered, for example, at intervals that may depend on the frequency with which aspects of a particular service are expected to or actually change. In one example, a particular service may be re-mapped three or more times per day. On the other hand, API proxy 602 may be expected to change at a lower frequency (e.g., once per month or once per year). Thus, when discovery application 700 updates the mapping of a particular service with a frequency that is higher than that at which API proxy 602 is expected to change, some of the discovery and/or mapping operations performed by discovery application 700 might not yield any new information about API proxy 602.

For example, re-execution of the operations of block 920 through arrow 926 may result in discovery application 700 obtaining the same assignment it has previously obtained during an earlier discovery and/or mapping process. Such re-execution of operations may consume additional time, network bandwidth, and computing resources. Additionally, in cases where usage of API proxy 602 is limited to a maximum quota, the API calls performed by discovery application 700 may count against the quota. In implementations where API proxy 602 is used by multiple different services, the mapping operations carried out for some of the services may be able to utilize the assignment (obtained at block 924) by another service that has been mapped at an earlier point in time.

Accordingly, discovery application 700 may be configured to generate and store a cache file that allows for the assignment of proxy URLs to target URLs provided by API proxy 602 to be re-used over time for multiple discovery and/or mapping operations. Namely, the cache file may store at least (i) the assignment of proxy URLs to target URLs (e.g., generated at block 924) and (ii) a time at which this assignment was generated by API proxy 602. Discovery application 700 may be configured, during discovery and/or mapping operations for a service, to search for the cache file and determine whether a current time (i.e., the time at which mapping is being carried out) exceeds the time indicated by the cache file by more than a predetermined amount of time. The predetermined amount of time may be based on, for example, the frequency at which API proxy 602 is expected to be updated or is actually updated. For example, if API proxy 602 is expected to be updated (e.g., on average) once per month, the predetermined amount of time may be equal to one week.

When the current time exceeds the time indicated by the cache file by more than the predetermined amount, discovery application 700 may be configured to obtain an updated version of the assignment of proxy URLs to target URLs from API proxy 602 (i.e., execute the operations of block 920 through arrow 926). Discovery application 700 may also update the cache file with the updated version of the assignment and indicate the time at which this updated version of the assignment was generated. On the other hand, when the current time does not exceed the time indicated by the cache file by more than the predetermined amount, discovery application 700 may be configured to obtain the assignment of proxy URLs to target URLs from the cache file. Thus, using the cache file, the mapping of a service may be updated and/or additional services may be mapped without discovery application 700 having to communicate with API proxy 602.

In one implementation, the cache file may be stored by discovery application 700 on the computing device associated with the service undergoing discovery and/or mapping. For example, the cache file may be stored on server device 800 in the same directory as the configuration file (detected at block 914) that is used to identify the proxy URL used by the service. Thus, detection of the configuration file and identification of the proxy URL may cause discovery application 700 to search this directory for the cache file and attempt to identify therein an assignment between the proxy URL and the target URL before performing the operations of block 920 and onwards.

In some implementations, a service may be hosted by multiple server devices disposed behind a load balancer. In such cases, one cache file may be stored on each of these load-balanced server devices, with the total number of cache files ranging up to the total number of load-balanced server devices. Alternatively, one cache file may be shared among each of the load-balanced server devices. Thus, the cache file may be stored in a shared location accessible to each of the server device. For example, the cache file may be stored on (i) the server device that acts as the load balancer, (ii) network-attached storage, (iii) a proxy server device within managed network 300 that executes at least a portion of the operations of discovery application 700, or (iv) a computational instance of remote network management platform 320, among other possibilities. Thus, even when a service is distributed among multiple server devices, one cache file may nevertheless be used for the service. In some cases, multiple cache files may be used, one file per load-balanced server, with each file nevertheless stored in the shared location.

Discovery application 700 may be configured to select one of these storage locations for the cache file during the discovery and/or mapping process. The storage location may be selected based on various factors including, for example, the availability of the different storage locations and the privileges granted to access such locations to discovery application 700.

X. Additional Example Operations

Figure 10:
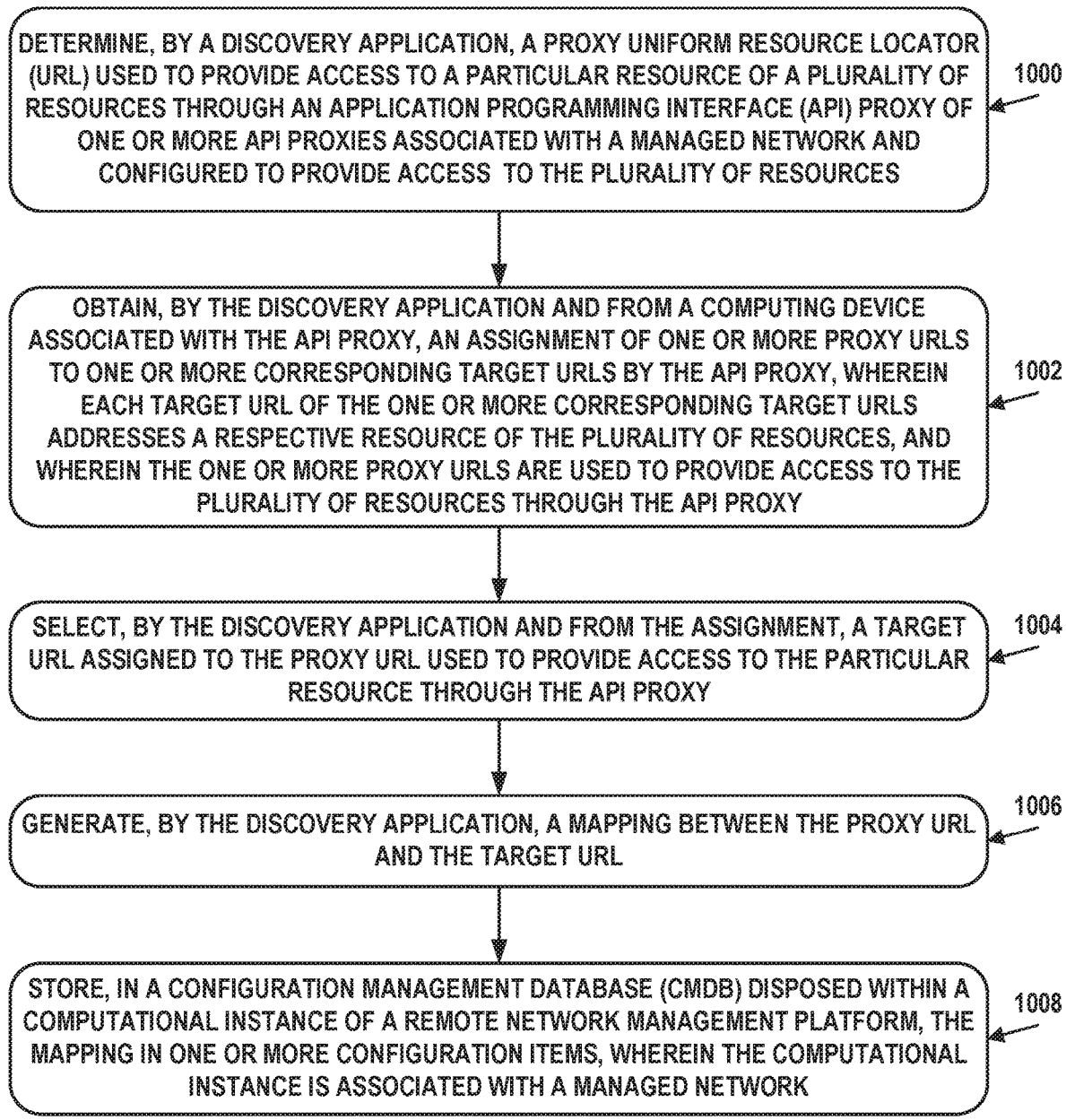
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 involves determining, by a discovery application, a proxy URL used to provide access to a particular resource of a plurality of resources through an API proxy of one or more API proxies associated with a managed network and configured to provide access to the plurality of resources.

Block 1002 involves obtaining, by the discovery application and from a computing device associated with the API proxy, an assignment of one or more proxy URLs to one or more corresponding target URLs by the API proxy. Each target URL of the one or more corresponding target URLs may address a respective resource of the plurality of resources. The one or more proxy URLs may be used to provide access to the plurality of resources through the API proxy.

Block 1004 involves selecting, by the discovery application and from the assignment, a target URL assigned to the proxy URL used to provide access to the particular resource through the API proxy.

Block 1006 involves generating, by the discovery application, a mapping between the proxy URL and the target URL.

Block 1008 involves storing, in a CMDB disposed within a computational instance of a remote network management platform, the mapping in one or more configuration items. The computational instance may be associated with a managed network.

In some embodiments, determining the proxy URL used to provide access to the particular resource through the API proxy may involve detecting data on a computing device within the managed network. The data may indicate that the computing device within the managed network is configured to transmit, to the computing device associated with the API proxy, one or more second requests addressed to the one or more proxy URLs. The one or more second requests may be transmitted in response to the computing device within the managed network receiving a first request addressed to a particular URL associated with the computing device within the managed network. The data may be parsed to identify therein the proxy URL.

In some embodiments, the particular URL may address a service within the managed network. Detecting the data may involve identifying, on the computing device within the managed network, a configuration file of a server application configured to provide at least a portion of the service and parsing the configuration file to detect therein the data.

In some embodiments, obtaining the assignment may involve determining, based on the proxy URL, a command configured to cause the computing device associated with the API proxy to generate data indicative of the assignment. The command and an authentication token configured to grant the discovery application access to the data may be transmitted to the computing device associated with the API proxy. The data may be received from the computing device associated with the API proxy.

In some embodiments, determining the proxy URL used to provide access to the particular resource through the API proxy may involve receiving, from a computing device within the managed network, an indication of one or more services to be discovered by the discovery application and receiving, from the computing device within the managed network, the proxy URL to be discovered as part of discovery of the one or more services.

In some embodiments, a first portion of the plurality of resources may be provided by the managed network and a second portion of the plurality of resources may be provided by third-party networks.

In some embodiments, a cache file that stores (i) a first time at which the assignment is obtained and (ii) the assignment may be generated. The cache file may be detected at a second time while attempting to obtain an updated version of the assignment. It may be determined whether the second time exceeds the first time by at least a threshold amount. When the second time exceeds the first time by at least the threshold amount, the updated version of the assignment may be obtained from the computing device associated with the API proxy. When the second time does not exceed the first time by at least the threshold amount, the assignment may be retrieved from the cache file.

In some embodiments, the managed network may be associated with a plurality of services that use the one or more API proxies to access the plurality of resources. The first time may be associated with mapping of a first service of the plurality of services by the discovery application. The second time may be associated with mapping of a second service of the plurality of services by the discovery application. When the second time does not exceed the first time by at least the threshold amount, it may be determined that the cache file indicates an assignment of an additional proxy URL to an additional target URL. The additional proxy URL may be used by the second service to access through the API proxy the respective resource addressed by the additional target URL. Based on the cache file, an additional mapping between the second service, the additional proxy URL, and the additional target URL may be generated. The additional mapping stored in one or more additional configuration items in the CMDB.

In some embodiments, the managed network may be associated with a service that uses the one or more API proxies to access one or more resources of the plurality of resources. The service may be provided by a plurality of load-balanced server devices. The cache file may be stored by the discovery application on a proxy server device on behalf of the plurality of load-balanced server devices. The first time may be associated with mapping of the service by way of a first load-balanced server device of the plurality of load-balanced server devices. The second time may be associated with mapping of the service by way of a second load-balanced server device of the plurality of load-balanced server devices.

In some embodiments, the managed network may be associated with a service that uses the one or more API proxies to access one or more resources of the plurality of resources. The service may be provided by a server device. The cache file may be stored on the server device. The first time and the second time may each be associated with mapping of the service by way of the server device.

In some embodiments, the mapping between the proxy URL and the target URL may indicate the particular resource addressed by the target URL.

In some embodiments, the mapping between the proxy URL and the target URL may indicate a communicative relationship between (i) the particular resource addressed by the target URL and (ii) a service that uses the proxy URL to access the particular resource by way of the API proxy.

In some embodiments, the API proxy may be configured to receive, from an additional computing device, a request addressed to the proxy URL. The request may have a first format. The API proxy may modify the request to have a second format different than the first format based on attributes associated with the particular resource addressed by the target URL. The API proxy may transmit the modified request to the particular resource addressed by the target URL. The API proxy may receive, from the particular resource addressed by the target URL, a response to the modified request. The response may have a third format. The API proxy may modify the response to have a fourth format different than the third format. The API proxy may transmit the modified response to the additional computing device.

In some embodiments, the first format and the fourth format may be the same or similar. The second format and the third format may be the same or similar.

XI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a configuration management database (CMDB) disposed within a computational instance of a remote network management platform, wherein the computational instance is associated with a managed network, and wherein one or more application programming interface (API) proxies associated with the managed network provide access to a plurality of resources; and
a discovery application configured to perform operations comprising:

identifying a source uniform resource locator (URL) associated with a first service operating on a computing device within the managed network, wherein the first service comprises a configuration file comprising one or more proxy URLs associated with the plurality of resources;

accessing the first service using the source URL;

detecting, on the first service, data indicative of the configuration file associated with at least a portion of the first service;

identifying at least a first proxy URL of the one or more proxy URLs by parsing the configuration file, wherein the first proxy URL is associated with the source URL, and wherein the first proxy URL is used to provide access to a particular resource of the plurality of resources through an API proxy of the one or more API proxies;

obtaining, from a computing device associated with the API proxy, an assignment of the one or more proxy URLs to one or more corresponding target URLs by the API proxy, wherein each target URL of the one or more corresponding target URLs addresses a respective resource of the plurality of resources, and wherein the one or more proxy URLs are used to provide access to the plurality of resources through the API proxy;

selecting, from the assignment, a target URL assigned to the first proxy URL used to provide access to the particular resource through the API proxy;

generating a mapping between the first proxy URL and the target URL; and storing, in the CMDB, the mapping in one or more configuration items.

2. The computing system of claim 1, wherein determining the first proxy URL used to provide access to the particular resource through the API proxy comprises:

detecting data, by parsing the configuration file, indicating that the computing device within the managed network is configured to transmit, to the computing device associated with the API proxy, one or more second requests addressed to the one or more proxy URLs.

3. The computing system of claim 1, wherein obtaining the assignment comprises:

determining, based on the first proxy URL, a command configured to cause the computing device associated with the API proxy to generate data indicative of the assignment;

transmitting, to the computing device associated with the API proxy, the command and an authentication token configured to grant the discovery application access to the data; and receiving, from the computing device associated with the API proxy, the data.

4. The computing system of claim 1, wherein determining the first proxy URL used to provide access to the particular resource through the API proxy comprises:

receiving, from a computing device within the managed network, an indication of the first service to be discovered by the discovery application; and receiving, from the computing device within the managed network, the first proxy URL to be discovered as part of discovery of the first service.

5. The computing system of claim 1, wherein (i) a first portion of the plurality of resources are provided by the managed network and (ii) a second portion of the plurality of resources are provided by third-party networks.

6. The computing system of claim 1, wherein the operations further comprise:

generating a cache file that stores (i) a first time at which the assignment is obtained and (ii) the assignment;

detecting the cache file at a second time while attempting to obtain an updated version of the assignment;

determining whether the second time exceeds the first time by at least a threshold amount;

when the second time exceeds the first time by at least the threshold amount, obtaining the updated version of the assignment from the computing device associated with the API proxy; and when the second time does not exceed the first time by at least the threshold amount, retrieving the assignment from the cache file.

7. The computing system of claim 6, wherein the managed network is associated with a plurality of services including the first service that use the one or more API proxies to access the plurality of resources, wherein the first time is associated with mapping of the first service of the plurality of services by the discovery application, and wherein the second time is associated with mapping of a second service of the plurality of services by the discovery application, and wherein the operations further comprise:

when the second time does not exceed the first time by at least the threshold amount, determining that the cache file indicates an assignment of an additional proxy URL to an additional target URL, wherein the additional proxy URL is used by the second service to access through the API proxy the respective resource addressed by the additional target URL;

generating, based on the cache file, an additional mapping between the second service, the additional proxy URL, and the additional target URL; and storing, in the CMDB, the additional mapping in one or more additional configuration items.

8. The computing system of claim 6, wherein the managed network is associated with the first service, the first service uses the one or more API proxies to access one or more resources of the plurality of resources, wherein the first service is provided by a plurality of load-balanced server devices, wherein the cache file is stored by the discovery application on a proxy server device on behalf of the plurality of load-balanced server devices, wherein the first time is associated with mapping of the first service by way of a first load-balanced server device of the plurality of load-balanced server devices, and wherein the second time is associated with mapping of the first service by way of a second load-balanced server device of the plurality of load-balanced server devices.

9. The computing system of claim 6, wherein the managed network is associated with the first service that uses the one or more API proxies to access one or more resources of the plurality of resources, wherein the first service is provided by a server device, wherein the cache file is stored on the server device, wherein the first time and the second time are each associated with mapping of the first service by way of the server device.

10. The computing system of claim 1, wherein the mapping between the first proxy URL and the target URL indicates the particular resource addressed by the target URL.

11. The computing system of claim 1, wherein the mapping between the first proxy URL and the target URL indicates a communicative relationship between (i) the particular resource addressed by the target URL and (ii) the first service.

12. The computing system of claim 1, wherein the API proxy is configured to:
- receive, from an additional computing device, a request addressed to the first proxy URL, wherein the request has a first format;
- modify the request to have a second format different than the first format based on attributes associated with the particular resource addressed by the target URL;
- transmit the modified request to the particular resource addressed by the target URL;
- receive, from the particular resource addressed by the target URL, a response to the modified request, wherein the response has a third format;
- modify the response to have a fourth format different than the third format; and
- transmit the modified response to the additional computing device.

13. A method comprising:
- identifying, by a discovery application, a source uniform resource locator (URL) associated with a first service operating on a computing device within the managed network, wherein the first service comprises a configuration file comprising one or more proxy URLs associated with the plurality of resources;
- accessing, by the discovery application, the first service using the source URL;
- detecting, on the first service, by the discovery application, data indicative of the configuration file associated with at least a portion of the first service;
- identifying, by the discovery application, at least a first proxy URL of the one or more proxy URLs by parsing the configuration file, wherein the first proxy URL is associated with the source URL, and wherein the first proxy URL is used to provide access to a particular resource of a plurality of resources through an application programming interface (API) proxy of one or more API proxies associated with a managed network and configured to provide access to the plurality of resources;
- obtaining, by the discovery application and from a computing device associated with the API proxy, an assignment of the one or more proxy URLs to one or more corresponding target URLs by the API proxy, wherein each target URL of the one or more corresponding target URLs addresses a respective resource of the plurality of resources, and wherein the one or more proxy URLs are used to provide access to the plurality of resources through the API proxy;
- selecting, by the discovery application and from the assignment, a target URL assigned to the first proxy URL used to provide access to the particular resource through the API proxy;
- generating, by the discovery application, a mapping between the first proxy URL and the target URL; and
- storing, in a configuration management database (CMDB) disposed within a computational instance of a remote network management platform, the mapping in one or more configuration items, wherein the computational instance is associated with the managed network.

14. The method of claim 13, wherein determining the first proxy URL used to provide access to the particular resource through the API proxy comprises:
- detecting data, parsing the configuration file, indicating that the computing device within the managed network is configured to transmit, to the computing device associated with the API proxy, one or more second requests addressed to the one or more proxy URLs.

15. The method of claim 13, further comprising:
- generating a cache file that stores (i) a first time at which the assignment is obtained and (ii) the assignment;
- detecting the cache file at a second time while attempting to obtain an updated version of the assignment;
- determining whether the second time exceeds the first time by at least a threshold amount; and
- based on whether the second time exceeds the first time by at least the threshold amount, obtaining the updated version of the assignment from the computing device associated with the API proxy, or retrieving the assignment from the cache file.

16. The method of claim 15, wherein the managed network is associated with a plurality of services including the first service that use the one or more API proxies to access the plurality of resources, wherein the first time is associated with mapping of the first service of the plurality of services by the discovery application, and wherein the second time is associated with mapping of a second service of the plurality of services by the discovery application, and wherein the method further comprises:
- determining that the second time does not exceed the first time by at least the threshold amount; and
- in response to determining that the second time does not exceed the first time by at least the threshold amount:
  (i) determining that the cache file indicates an assignment of an additional proxy URL to an additional target URL, wherein the additional proxy URL is used by the second service to access through the API proxy the respective resource addressed by the additional target URL, (ii) generating, based on the cache file, an additional mapping between the second service, the additional proxy URL, and the additional target URL, and (iii) storing, in the CMDB, the additional mapping in one or more additional configuration items.

17. The method of claim 15, wherein the managed network is associated with the first service, the first service uses the one or more API proxies to access one or more resources of the plurality of resources, wherein the first service is provided by a plurality of load-balanced server devices, wherein the cache file is stored by the discovery application on a proxy server device on behalf of the plurality of load-balanced server devices, wherein the first time is associated with mapping of the first service by way of a first load-balanced server device of the plurality of load-balanced server devices, and wherein the second time is associated with mapping of the first service by way of a second load-balanced server device of the plurality of load-balanced server devices.

18. An article of manufacture including a non-transitory computer-readable medium, having stored thereon program instructions that, upon execution by a computing system, cause the computing system to perform operations comprising:
- identifying a source uniform resource locator (URL) associated with a first service operating on a computing device within the managed network, wherein the first service comprises a configuration file comprising one or more proxy URLs associated with the plurality of resources;
- accessing the first service using the source URL;
- detecting, on the first service, data indicative of the configuration file associated with at least a portion of the first service;
- identifying at least a first proxy URL of the one or more proxy URLs by parsing the configuration file, wherein the first proxy URL is associated with the source URL, and wherein the first proxy URL is used to provide access to a particular resource of a plurality of resources through an application programming interface (API) proxy of one or more API proxies associated with a managed network and configured to provide access to the plurality of resources;

obtaining, from a computing device associated with the API proxy, an assignment of the one or more proxy URLs to one or more corresponding target URLs by the API proxy, wherein each target URL of the one or more corresponding target URLs addresses a respective resource of the plurality of resources, and wherein the one or more proxy URLs are used to provide access to the plurality of resources through the API proxy;

selecting, from the assignment, a target URL assigned to the first proxy URL used to provide access to the particular resource through the API proxy;

generating a mapping between the first proxy URL and the target URL; and storing, in a configuration management database (CMDB) disposed within a computational instance of a remote network management platform, the mapping in one or more configuration items, wherein the computational instance is associated with the managed network.

* * * * *